United States Patent
Rosenblum et al.

(10) Patent No.: US 10,178,923 B2
(45) Date of Patent: Jan. 15, 2019

(54) MULTI-FUNCTION ORGANIZER FOR SMART WATCHES AND WRIST WATCHES

(71) Applicants: Neal Rosenblum, Hollywood, FL (US); Mark Presser, Los Angeles, CA (US); Jonathan Jaech, Los Angeles, CA (US)

(72) Inventors: Neal Rosenblum, Hollywood, FL (US); Mark Presser, Los Angeles, CA (US); Jonathan Jaech, Los Angeles, CA (US)

( * ) Notice: Subject to any disclaimer, the term of this patent is extended or adjusted under 35 U.S.C. 154(b) by 0 days.

(21) Appl. No.: 15/626,122

(22) Filed: Jun. 17, 2017

(65) Prior Publication Data

US 2018/0360251 A1     Dec. 20, 2018

(51) Int. Cl.
| | |
|---|---|
| *A47G 29/08* | (2006.01) |
| *F16B 1/00* | (2006.01) |
| *F16M 11/16* | (2006.01) |
| *F21V 23/04* | (2006.01) |
| *H02J 7/02* | (2016.01) |

(52) U.S. Cl.
CPC ............ *A47G 29/08* (2013.01); *F16B 1/00* (2013.01); *F16M 11/16* (2013.01); *F21V 23/0471* (2013.01); *F21V 23/0485* (2013.01); *H02J 7/025* (2013.01); *F16B 2001/0035* (2013.01)

(58) Field of Classification Search
CPC ... A47G 29/08; F16B 1/00; F16B 2001/0035; F16M 11/16; F21V 23/0471; F21V 23/0485; H02J 7/025
USPC ............. 248/114–116, 688, 455; 211/85.2
See application file for complete search history.

(56) References Cited

U.S. PATENT DOCUMENTS

| | | | | |
|---|---|---|---|---|
| 4,707,146 | A | * | 11/1987 | Wein ............... A47F 7/022 248/116 |
| 7,798,682 | B1 | * | 9/2010 | Cvek ............... F21S 2/00 362/257 |
| 2013/0161962 | A1 | * | 6/2013 | Fitzgerald ........ E05C 19/16 292/251.5 |
| 2015/0028185 | A1 | * | 1/2015 | Mack ............... F16M 11/00 248/688 |
| 2015/0295437 | A1 | * | 10/2015 | Wang ............... H02J 7/0044 455/573 |
| 2015/0338635 | A1 | * | 11/2015 | Gantz .............. G02B 25/002 345/32 |
| 2016/0315496 | A1 | * | 10/2016 | Barnard ........... H02J 50/10 |
| 2016/0327800 | A1 | * | 11/2016 | Kuretich ......... G02B 27/027 |

* cited by examiner

*Primary Examiner* — Christopher Garft

(57) ABSTRACT

A multi-function organizer includes a holder coupled to a magnifying lens and base. The base defines a plane of stability. The holder is attached to the base and configured for supporting a wristwatch or smart watch while orienting the watch face generally perpendicular to the plane of stability, at a home location above the base. The magnifying lens is attached to the base at a location and positioned so that the lens magnifies the face when a watch is placed on the holder with its body at the home location. The holder may be configured for holding an inductive charger for a smart watch, so that when inserted into the holder, the charger is held adjacent to a rear surface the smart watch. The organizer may include a night light oriented to radiate light towards the home location, controlled by a sensor for detecting motion or touch.

12 Claims, 20 Drawing Sheets

MULTI-FUNCTION ORGANIZER FOR SMART WATCHES AND WRIST WATCHES

FIELD

The present disclosure concerns organizers for holding portable articles, and more particularly to an organizer for holding smart watches, wristwatches, or other wearable articles when not in use.

BACKGROUND

Wristwatches have been a practical and popular accessory for over a century, originally as purely mechanical devices for telling time, and later also as electronic or electro-mechanical devices. More recently, makers of electronic portable accessories, such as smart phones, have begun to develop and sell smart phone accessories having the form factor of a wristwatch, referred to herein as "smart watches." Besides telling time, smart watches can perform many other functions in cooperation with a linked smart phone, using a wireless connection. However, smart watches consume power at a much higher rate than regular electronic watches, and require frequent charging, e.g., daily. While being charged, the smart watch cannot be worn, but is still functional. Often, users will charge their smart watches at night, while the users are sleeping. Many users may keep their smart watches near them while sleeping, such as on a bedside table.

Bedside tables are often used to hold other accessories worn earlier in the day by someone sleeping in an adjacent bed. For example, jewelry boxes or stands are often found on such tables, sometimes holding conventional wristwatches as well as jewelry.

With so many compact timekeeping appliances residing on beside tables while their owners rest a few feet away, some watches are inevitably consulted for the time during moments the owners' of wakefulness. Many, however, are not. Many owners may find it difficult to see a watch dial or display with sleepy eyes in a dark room. The watch face may be too small or poorly illuminated to function well as a bedside clock. Some owners invest in a bedside clock with a larger display, which may be illuminated or glow in the dark. Others find illuminated clocks to be disruptive of their sleep habits, and simply go without any sort of timepiece in view that is actually useful for telling time.

It is evident, therefore, that millions of wristwatches and smart watches are underutilized the world over, in a sense. These timekeeping appliances sit languishing on bedside tables, keeping perfectly good time while their owners cannot see them. It would be desirable to overcome these and other limitations of wristwatches and smart watches somehow, while retaining their advantages in other circumstances.

DRAWINGS

DETAILED DESCRIPTION

Figure 1:
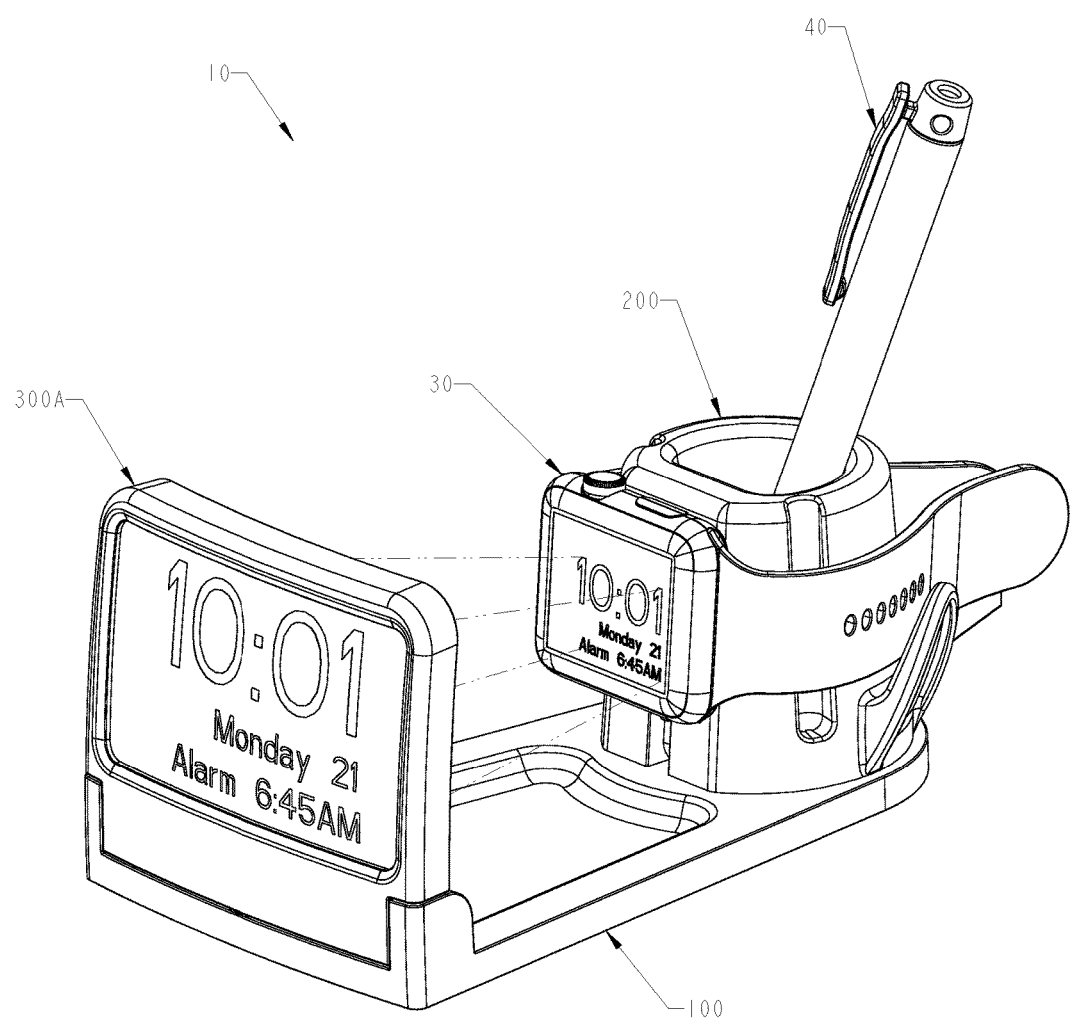
FIG. 1 is a front perspective view showing a first embodiment of a multi-function organizer holding a smart watch and pen, while charging the smart watch.
Figure 2:
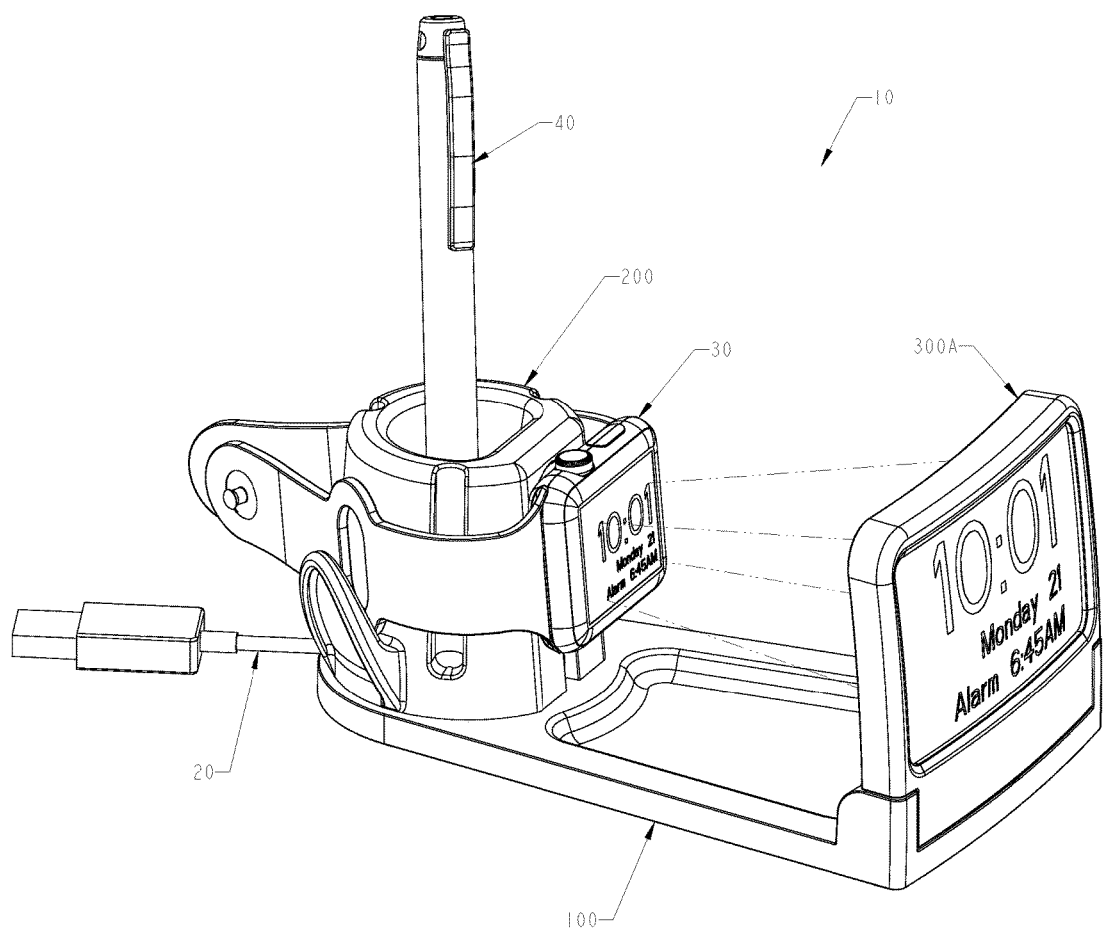
FIG. 2 is a side perspective view of the multi-function organizer shown in FIG. 1.
Figure 3:
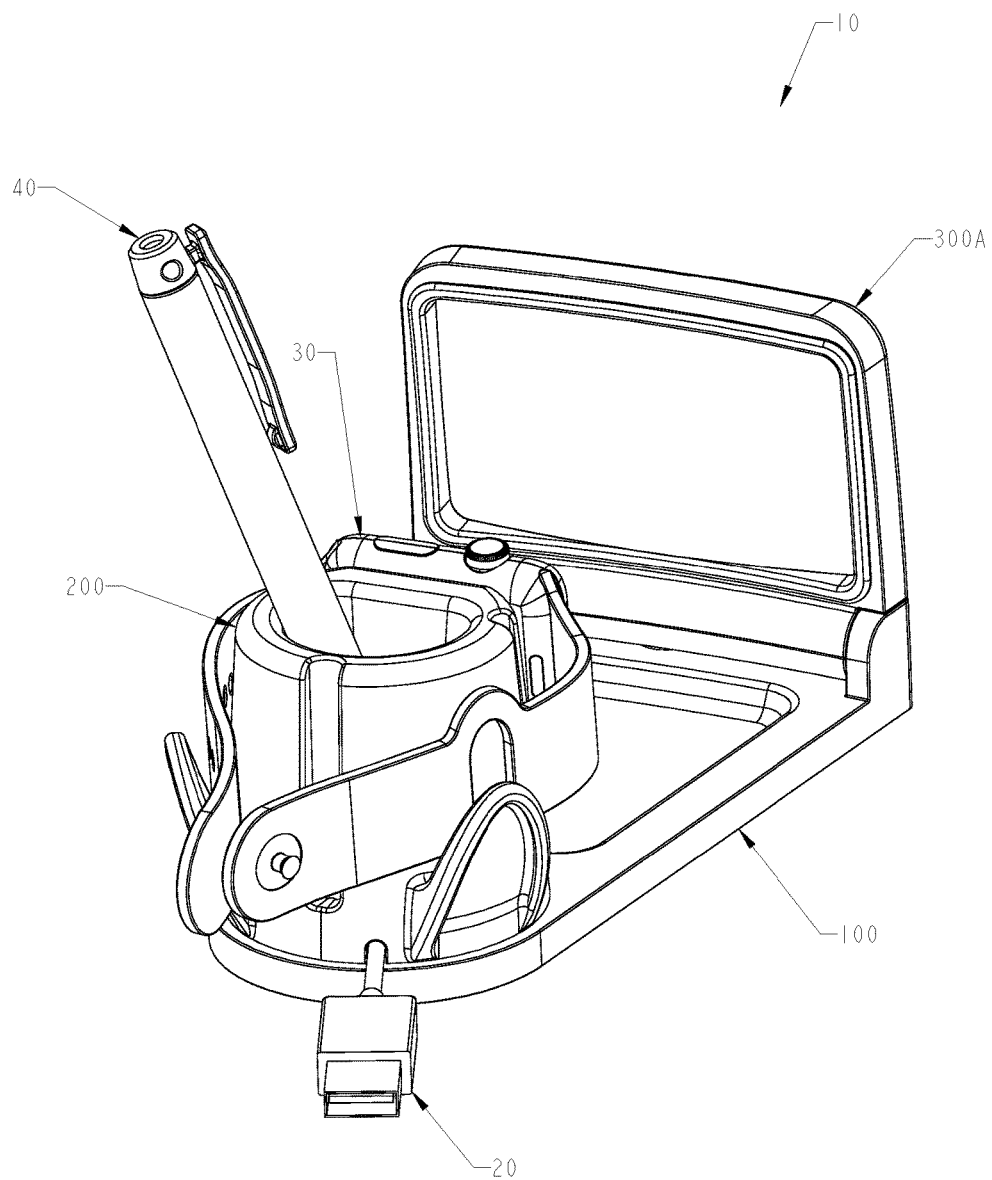
FIG. 3 is a rear perspective view of the multi-function organizer shown in FIG. 1.
Figure 4:
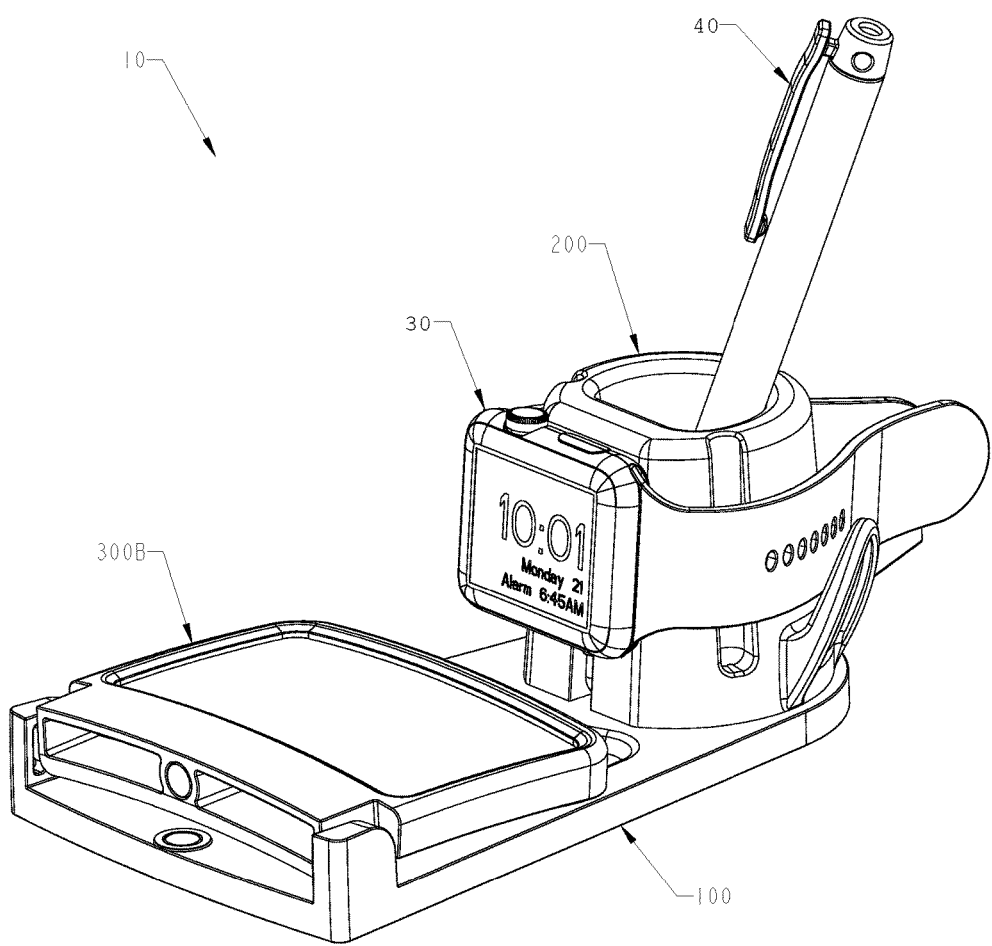
FIG. 4 is a front perspective view of the multi-function organizer shown in FIG. 1, showing the magnifying lens in a folded position.
Figure 5:
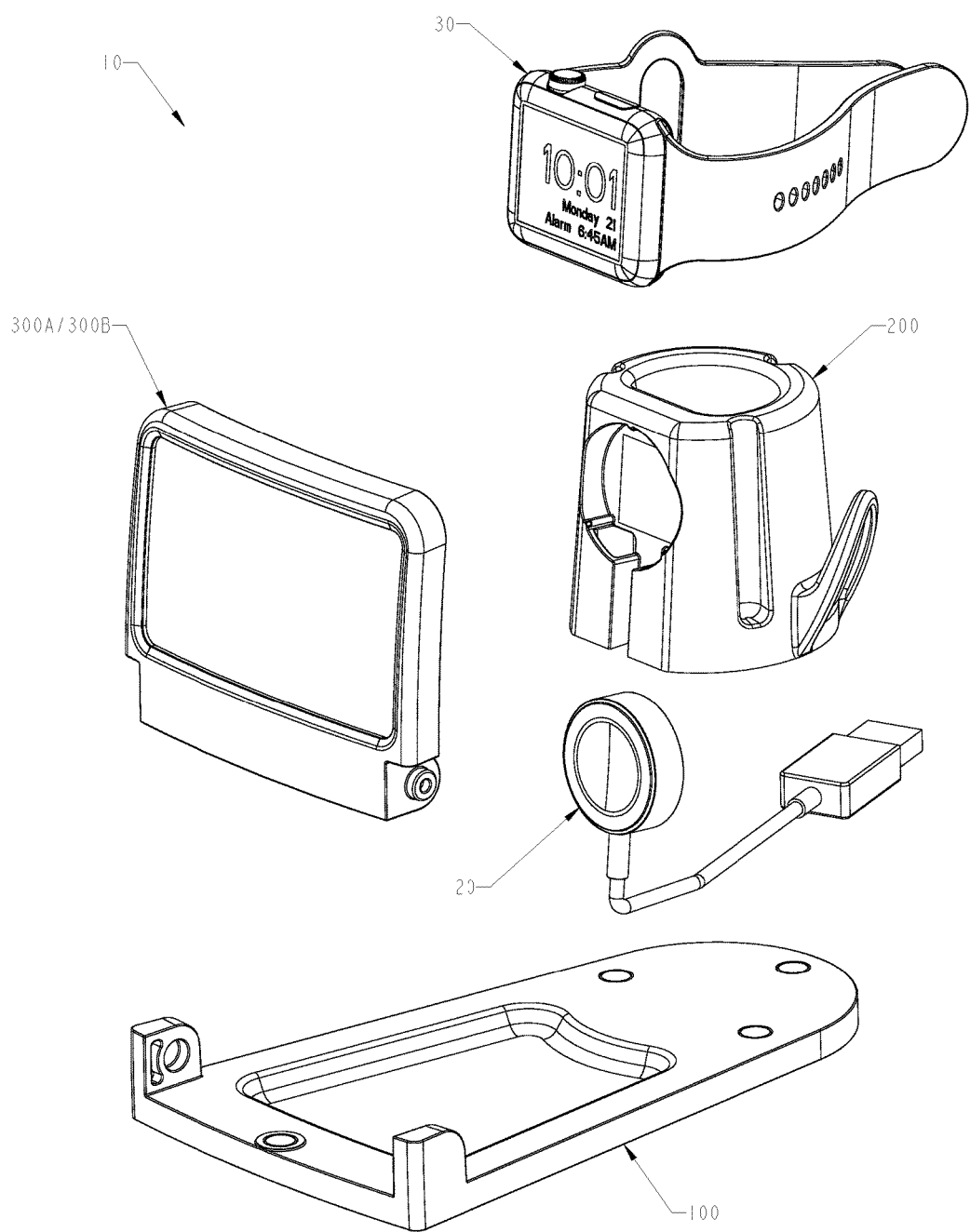
FIG. 5 is an exploded front perspective view of the multi-function organizer shown in FIG. 1.

The present disclosure describes a multi-function organizer 10 that increases the utility of wristwatches and smart watches, while organizing these and other objects in a tidy and convenient fashion. Referring generally to FIGS. 1-15, in an embodiment, a base 100 is configured for stably resting on a flat surface, such as a table top. As such, an undersurface of the base 100 (see FIG. 7) may include a plurality of rubber feet 120 defining a plane of stability parallel to flat surface on which the base rests. The rubber feet may be set in corresponding recesses 122 in the base 100. Referring to FIGS. 1-3, the multi-function organizer 10 includes a holder 200 (also called a pedestal) attached to the base 100 at a first location. In the illustrated embodiment, the first location is at a first of opposing ends of the base 100. The holder 200 configured for supporting a wristwatch or smart watch 30 and orienting a face thereof generally perpendicular to the plane of stability defined by the base 100. The holder 200 is designed to hold the body of the watch 30 at a home location above the base, oriented towards a magnifying lens 304. The watch 30 is shown for illustrative purposes, and is not part of the multi-function organizer 10. The illustrated major components (base 100, holder 200, and frame assembly 300) are designed for injection molding a ABS, polycarbonate, or other structural plastic typically used in the fabrication of consumer products. Each of the base, holder, and frame, and other illustrated components of the organizer may comprise an assembly of parts or may be made as one piece. Other materials and manufacturing modes may also be suitable, for example, additive manufacturing or machining.

The holder 200 may include a cup-like receptacle, shown holding a pen 40 for illustrative purposes; the pen is not part of the multi-function organizer 10. In the illustrated embodiment, the holder 100 has an overall shape of a tapered cylinder, having an upper diameter suitable for supporting a smart watch wristband, for example in the range of about 1 to 2 inches, or sufficient to accommodate timepieces with both small and/or large bands. Other shapes and sizes may also be suitable.

While a smart watch 30 is illustrated, it should be appreciated that the holder would function similarly for holding a traditional watch. With either type of watch, the wristband fits around an outer perimeter of the holder 200, and is prevented from falling to the base by a pair of protruding ears 206 (at least one or more ears) to capture laterally and stops 208 to capture vertically, indicated in FIGS. 9-10. The holder 200 may include two or more protruding stops 208 spaced around an outer perimeter of the holder, configured for preventing a wristband of the wristwatch or smart watch from sliding past the protruding stops towards the base, while retaining slack between the wristband and an exterior of the holder assembly 200 for ease of placement and removal. An inner surface 203 or the ears 206 engages the wristband. A continuous ledge (not shown) or similar feature may also be suitable for preventing the watch 30 from falling to the base.

Referring again to FIGS. 1-3, a magnifying lens in a frame assembly 300 is attached to the base 100 at a location spaced apart from the holder, oriented so that it magnifies the face when a watch is placed on the holder with its body at the home location. Advantageously, magnification increases visibility of the watch face for a user resting nearby. By moving the base slightly for example by tapping the table or nightstand on which the organizer resides, a user can trigger the motion sensor of the smart watch 30, causing it to display the time. Other sensors may be used to trigger the light, for example a capacitive switch.

Figure 9:
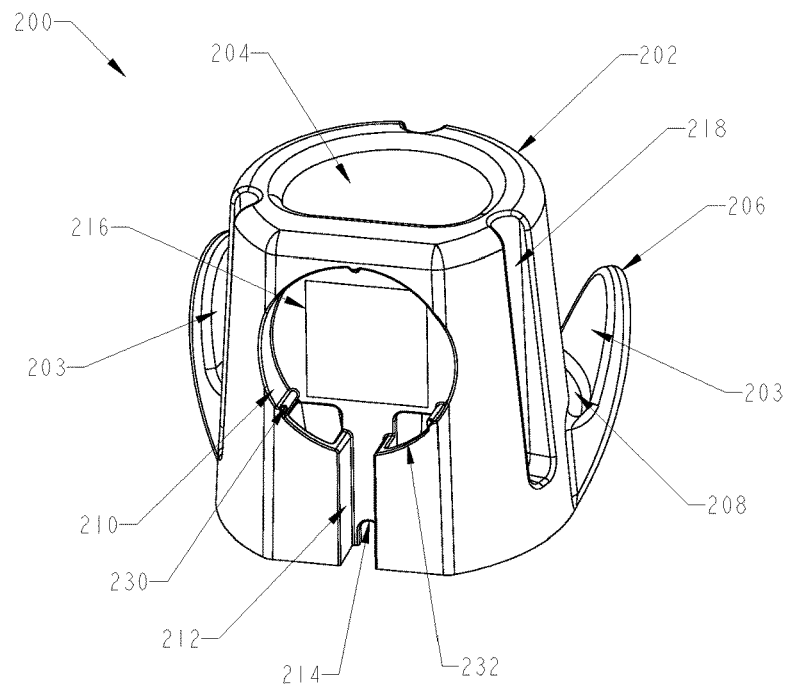
FIG. 9 is a front perspective view of an interchangeable holder for a smart watch and its associated charging unit, for which said holder is attachable to the base component of the multi-function organizer using magnets.
Figure 10:
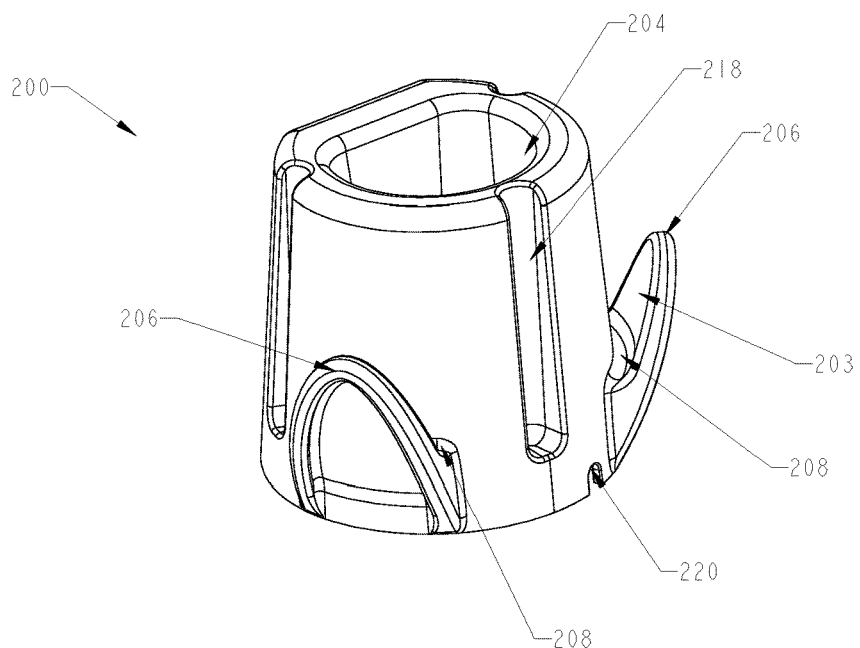
FIG. 10 is a rear perspective view of the interchangeable holder shown in FIG. 9.
Figure 11:
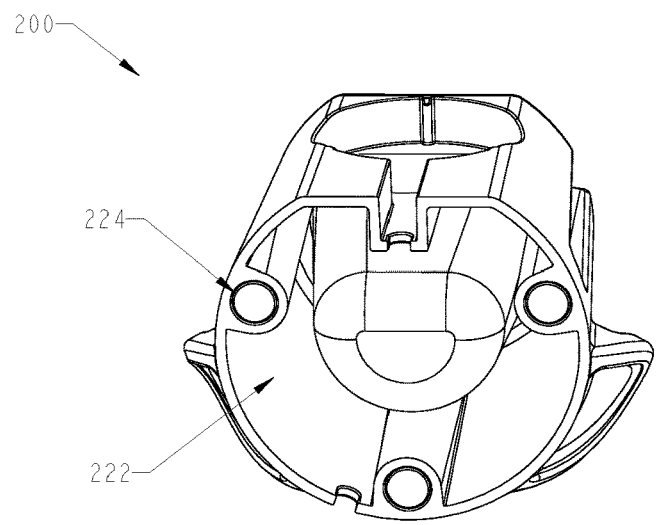
FIG. 11 is a lower perspective view of the interchangeable holder, showing magnets used to attach the holder to the base.
Figure 12:
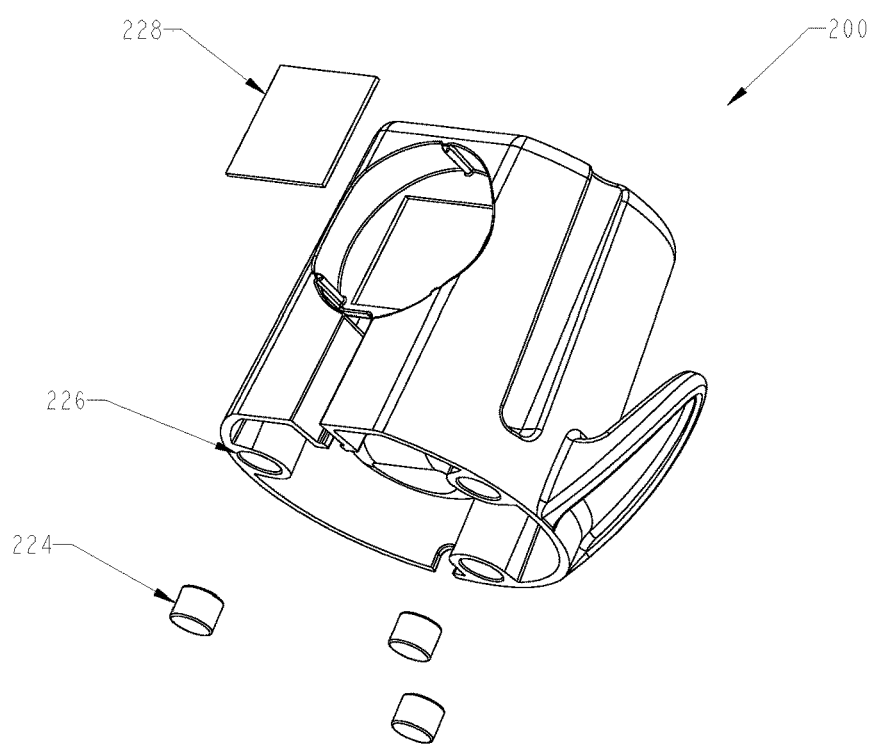
FIG. 12 is an exploded perspective view of the interchangeable holder.

In an aspect, the holder 200 is configured for holding an inductive wireless charger 20 for the smart watch adjacent to the home location. The charger cable shown in the accompanying illustrations is shown to have a short length in order to illustrate both ends of the cable. Charging cable lengths typically vary from 2 feet to 6 feet in length. As shown in FIGS. 3, 9 and 10, the holder 200 may include a slot 220 ("rear tunnel") passing through an exterior wall 202 thereof, for admitting a cord of the inductive charger. As shown in FIGS. 9 and 10, the holder includes a charger-holding feature 210, configured so that the inductive charger, when inserted into the holder, can be held adjacent to a rear surface of a body of the smart watch to charge the watch using a wireless inductive coupling. A recess 216 for an adhesive pad 228 (e.g., sticky gel pad, double-sided adhesive tape, or museum putty, FIG. 12) may be used to hold the inductive component (charging disk) of a charging assembly in the charger-holding feature 210. The cable for the charger may be contained in the cable groove 212, run through the front tunnel 214 and passed to the rear tunnel 220. In addition to the adhesive 228, or in an alternative, ribs 230 may be included in a perimeter of the charger-holding feature 210, for retaining the charging disk. Relief cuts 232 may be provided to enable users to more easily remove a charging disk from the charger-holding feature 210. The cup-like receptacle 204 is formed in an upper portion of the holder 200. Grooves 218 are features for material saving and for manufacturability. An underside 222 (FIGS. 11-12) may be hollowed out, also for material saving and for manufacturability.

Figure 6:
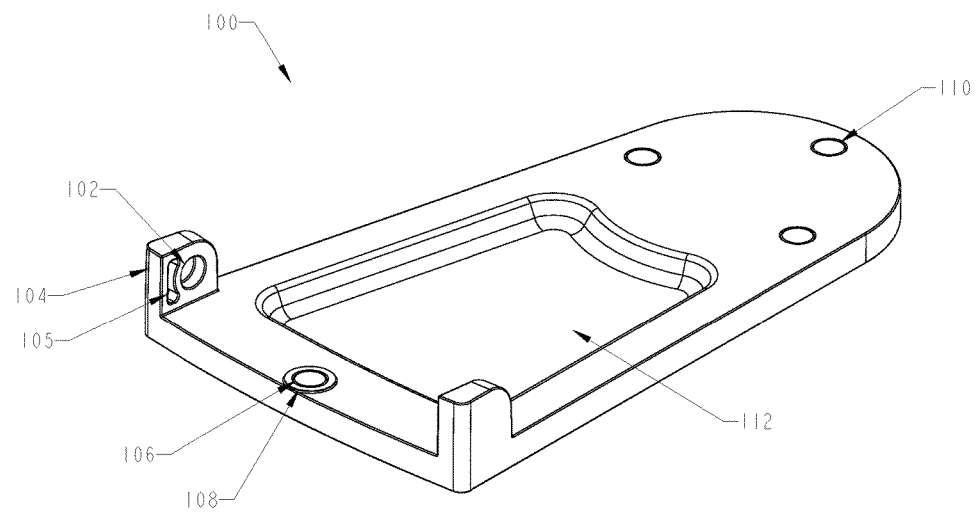
FIG. 6 is an upper perspective view of the base component of the multi-function organizer shown in FIG. 1.
Figure 7:
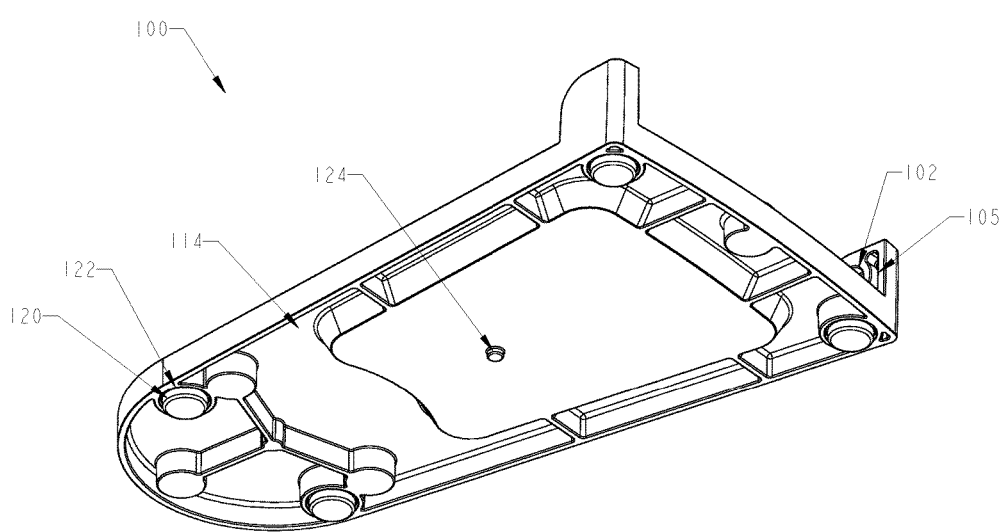
FIG. 7 is a lower perspective view of the base component shown in FIG. 6.

Referring to FIGS. 6 and 7, the base 100 may include a tray-like receptacle 112 in an upper surface thereof. A support post 124 may be included near the middle of the undersurface of the base, to better support heavy items (e.g., jewelry or coins) or the force exerted by the user on the tray 112 as they remove items from said tray. Such items may be placed in the tray-like receptacle as desired by the user.

In an aspect, the holder 200 is releasable from the base 100. While mechanical fasteners may be used, in the illustrated embodiment, magnetic fasteners are used to releasably secure the holder to the base 100. As shown in FIGS. 6, 8, 11 and 12, at least one of the base 100 or the holder 200 includes one or more magnets 110, 224 for attaching the holder to the base. The magnets 110, 224 may be, for example, round cylindrical rare-earth or ferrous magnets set into recesses 118, 226 formed in the base 100 and/or holder 200. A portion 114 of the underside of the base may be hollowed out for material saving and for manufacturability.

Figure 8:
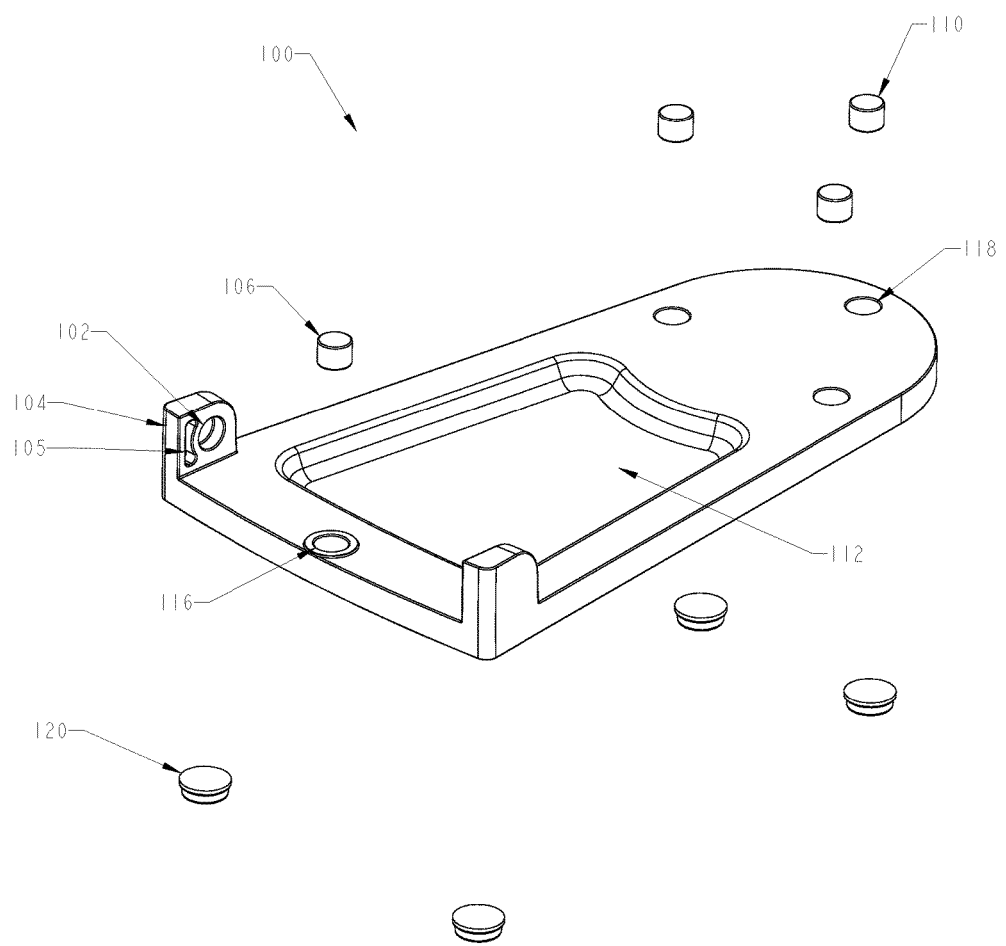
FIG. 8 is an exploded perspective view of the base component shown in FIG. 6.
Figure 13:
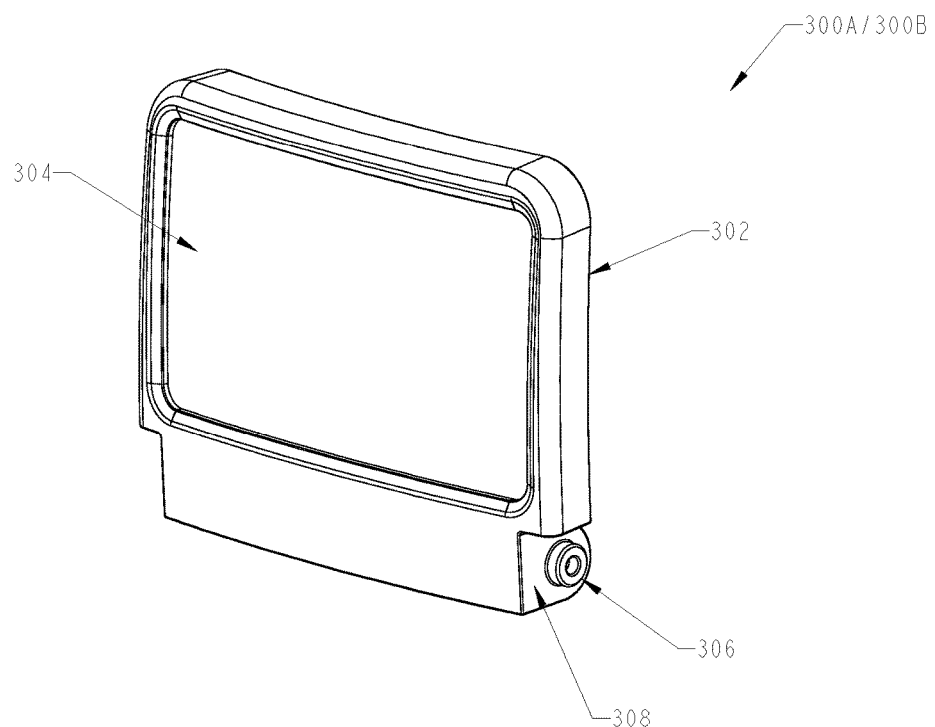
FIG. 13 is a front perspective view of a magnifying lens component of the multi-function beside organizer, which attaches to the base using an integral cylindrical boss that allows pivoting.
Figure 14:
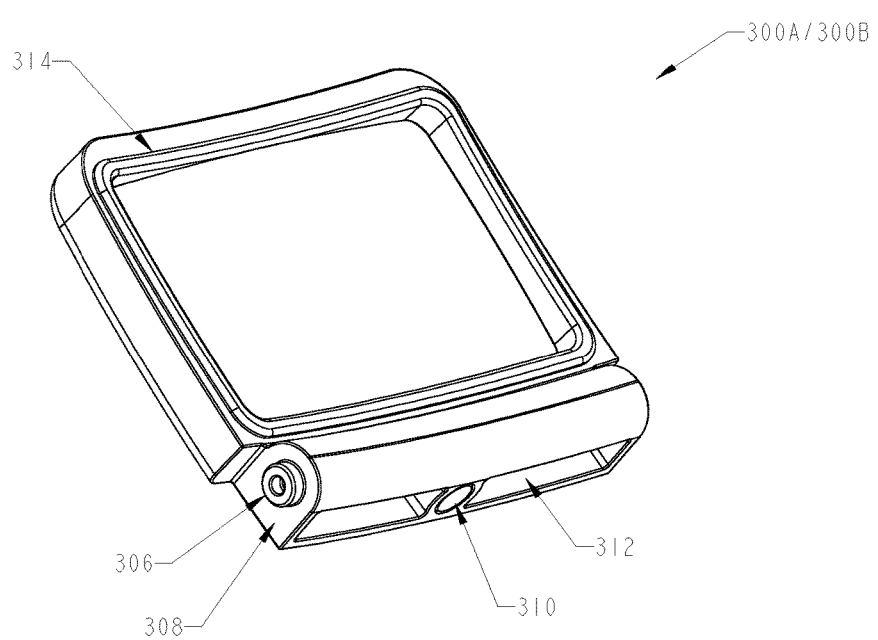
FIG. 14 is a rear lower perspective view of the magnifying lens component, showing placement of a magnet for releasably stabilizing the lens component in an upright position.
Figure 15:
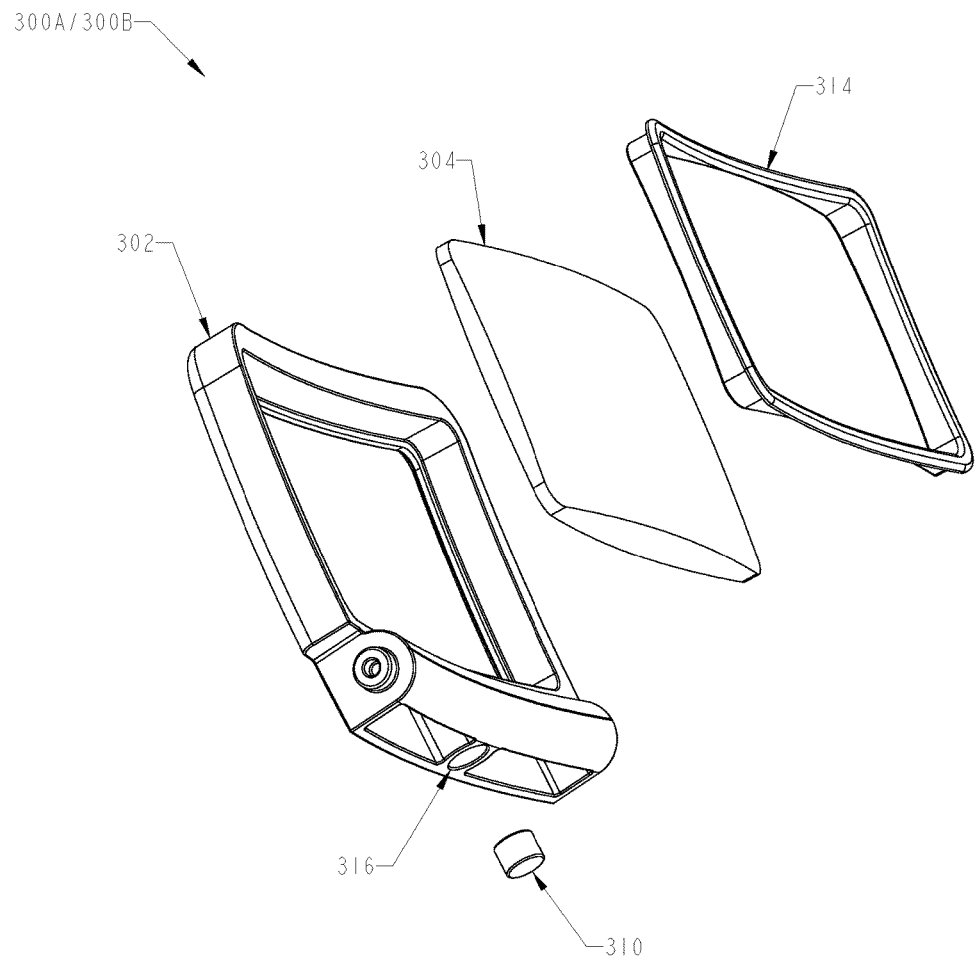
FIG. 15 is an exploded perspective view of the magnifying lens component.
Figure 16:
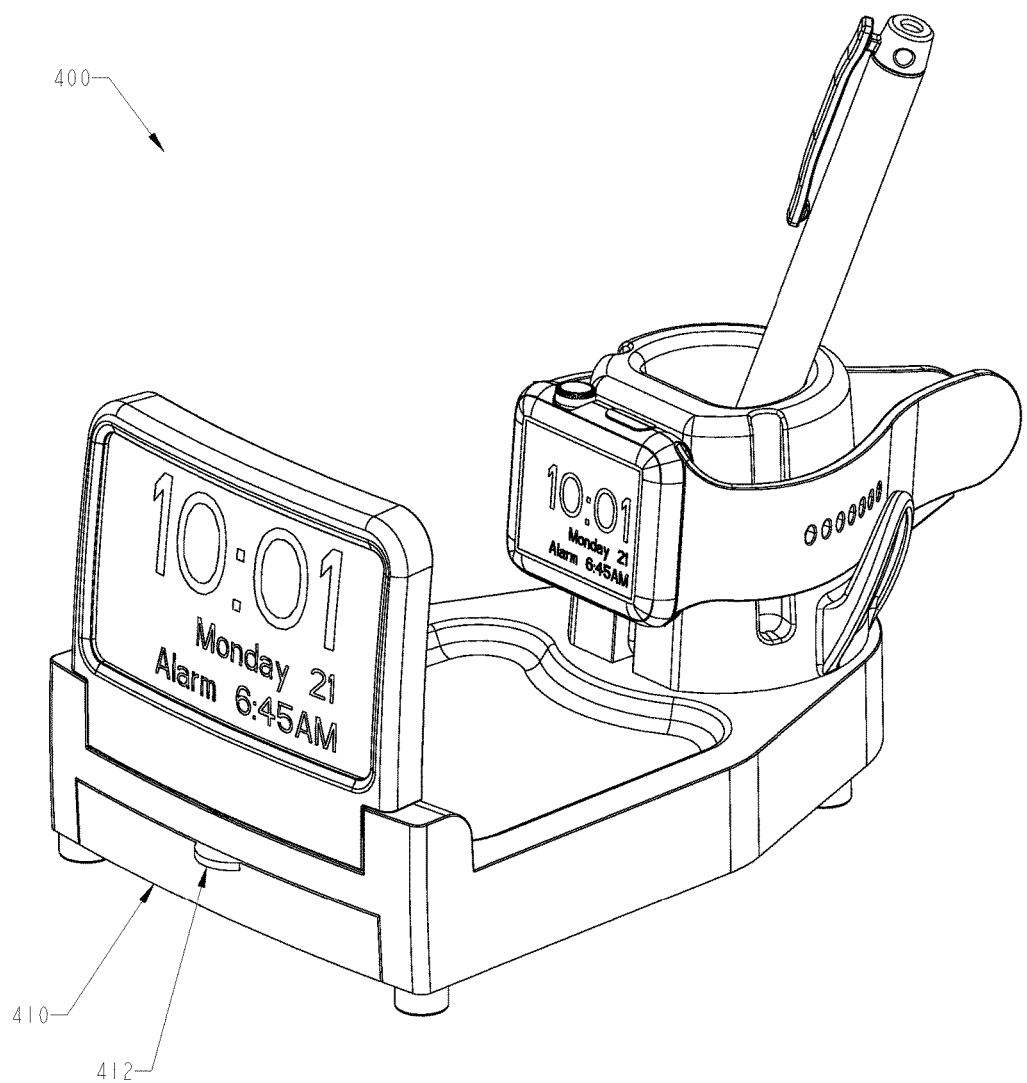
FIG. 16 is a front perspective of an alternative embodiment of the multi-function organizer, equipped with a slide-out lower tray.
Figure 17:
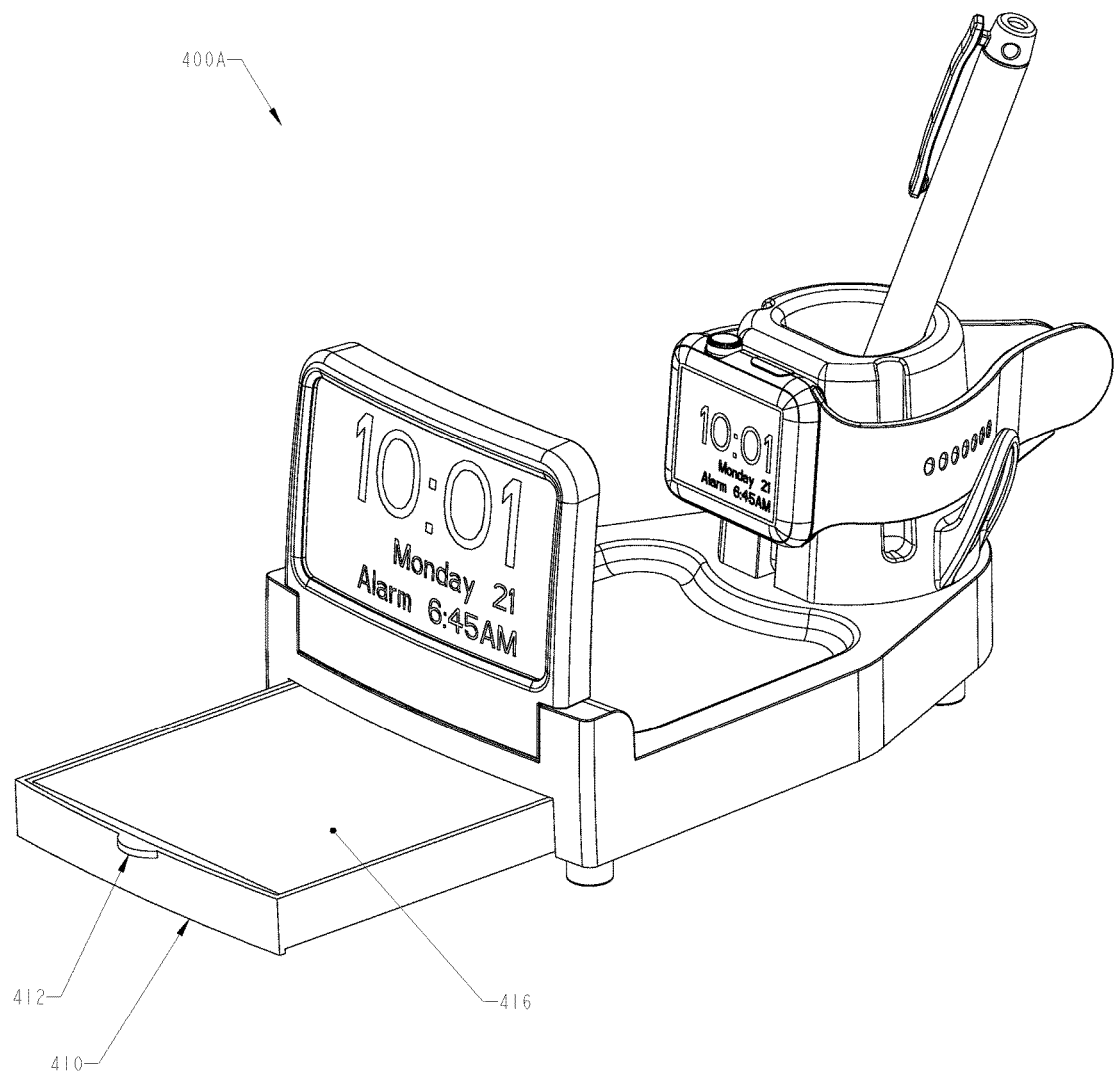
FIG. 17 is another front perspective view of the organizer shown in FIG. 16, showing the tray in an extended position.
Figure 18:
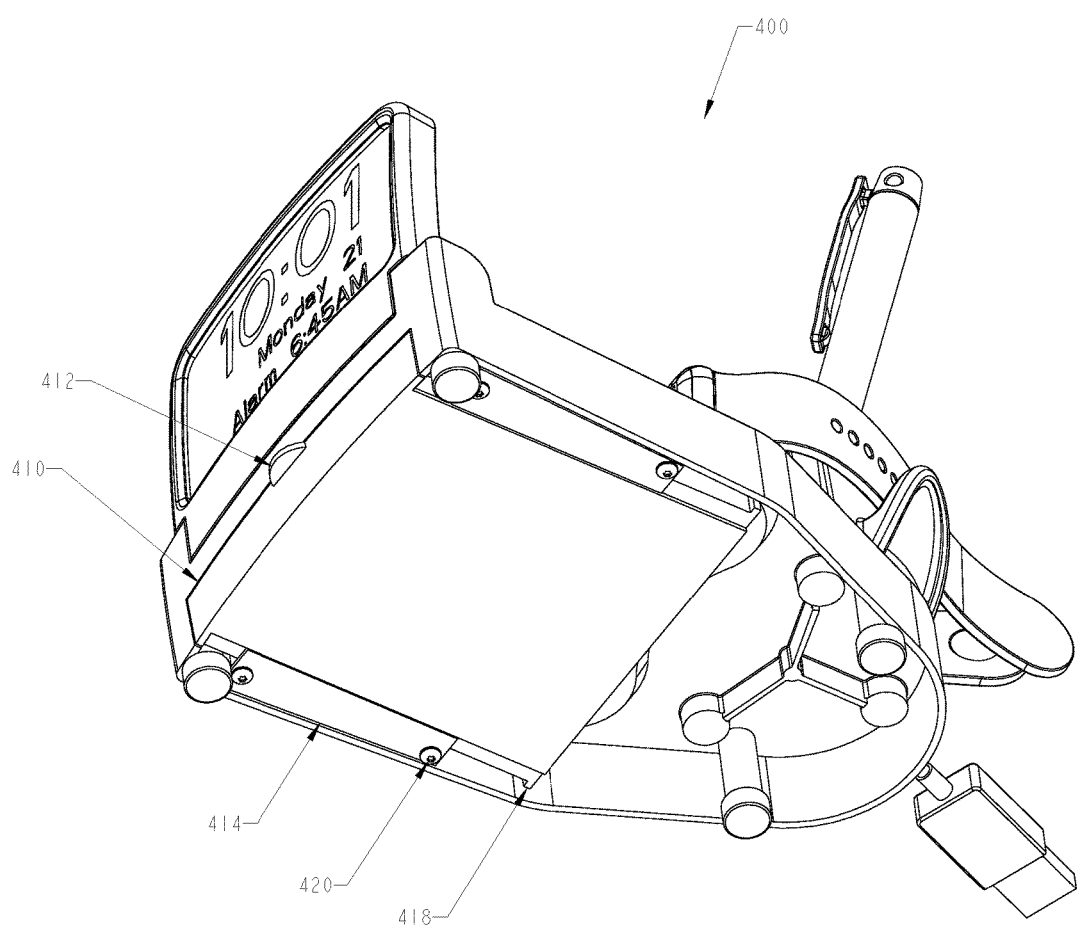
FIG. 18 is a lower perspective view of the organizer shown in FIG. 16.
Figure 19:
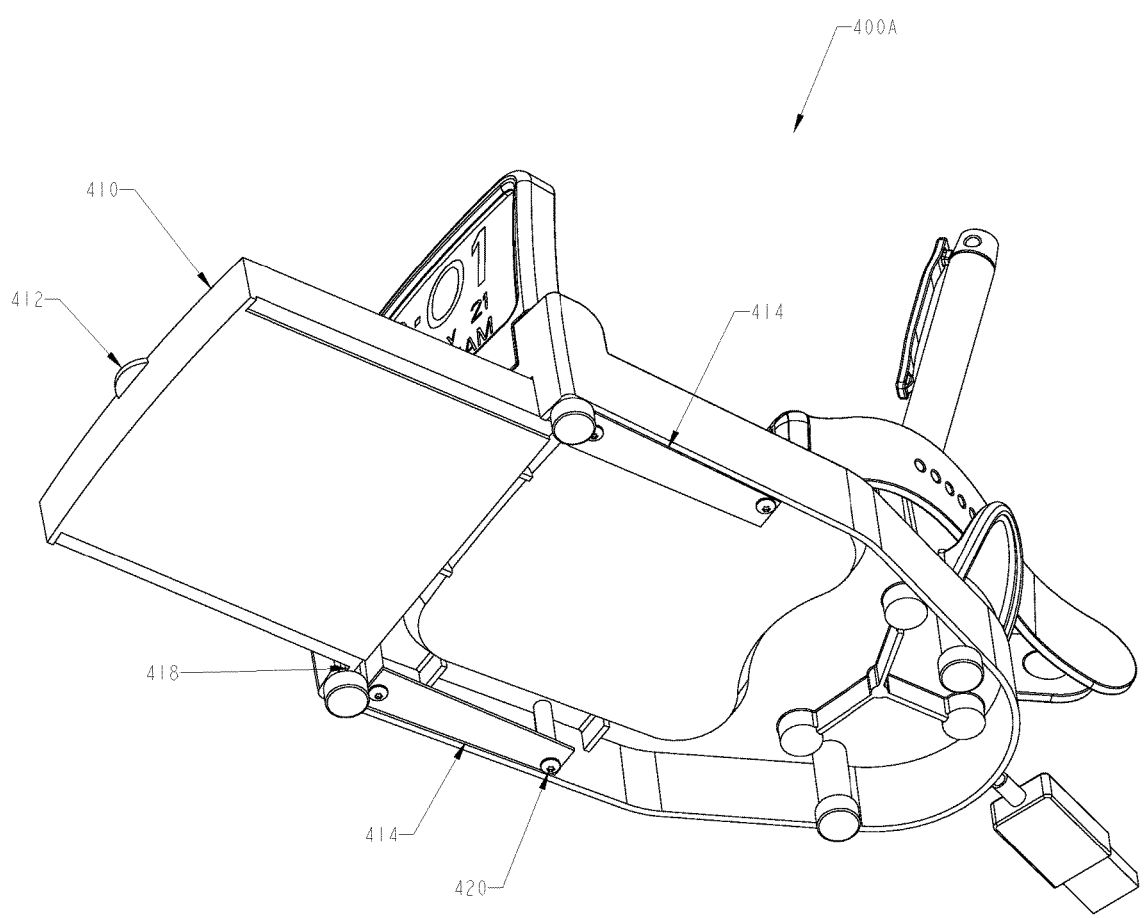
FIG. 19 is a lower perspective view of the organizer shown in FIG. 17.
Figure 20:
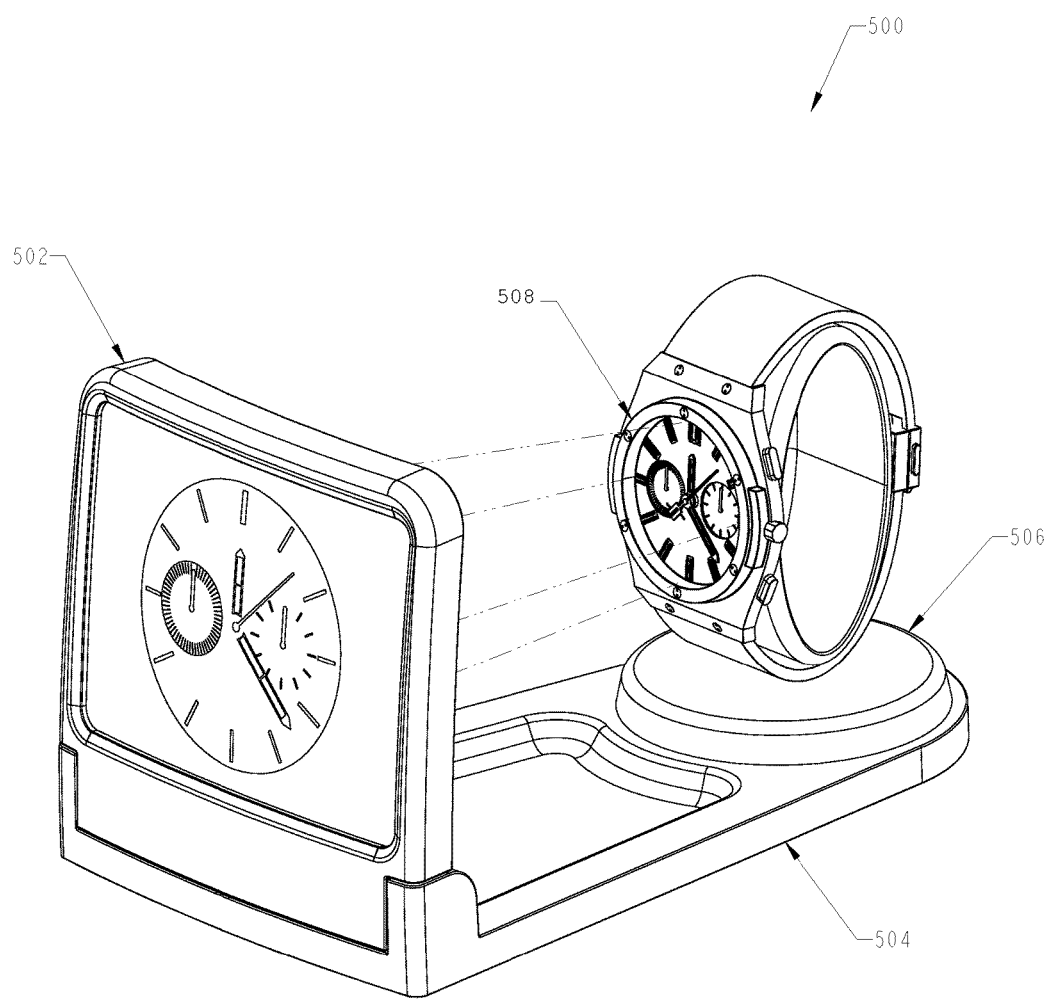
FIG. 20 is a front perspective view of the organizer shown with a transverse pedestal holding a conventional watch.
Figure 21:
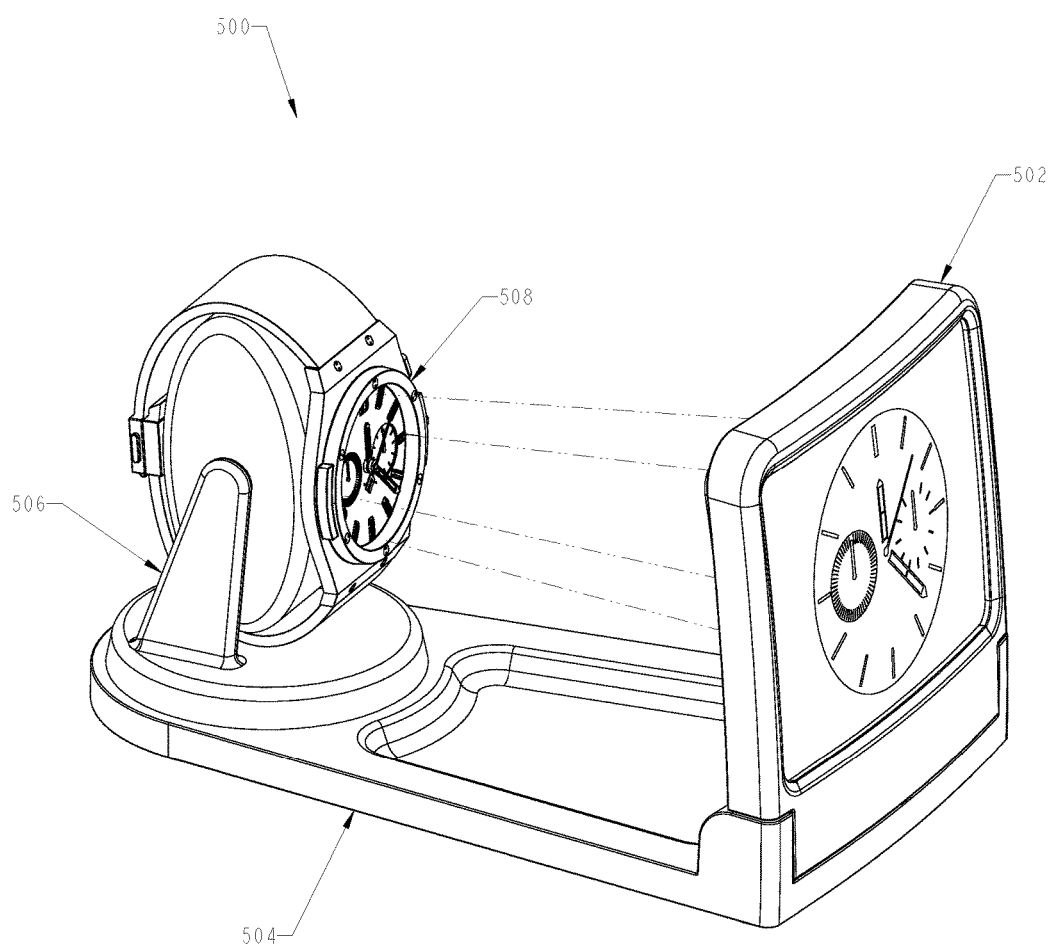
FIG. 21 is a side perspective view of the organizer shown in FIG. 20.
Figure 22:
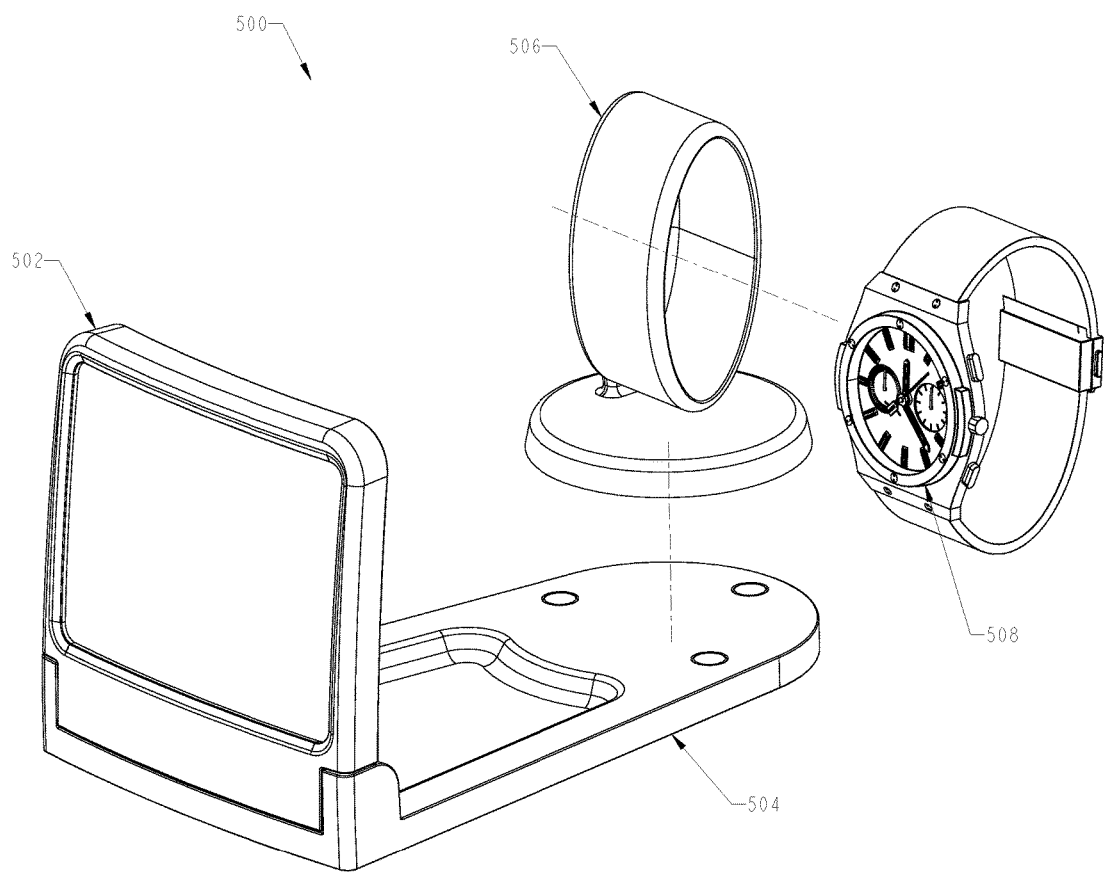
FIG. 22 is an exploded view of the organizer shown in FIG. 20.

Referring to FIGS. 13-15, the multi-function organizer may include a pivoting frame assembly 300 supporting the magnifying lens 304. The frame assembly 300 A/B includes the lens 304 captured between a frame 302 and a retainer 314. The frame 302 includes a lower hinge 308, which may include a pair of cylindrical posts 306 aligned along their longitudinal axes. The hinge 308 may further include a hollowed out portion 312, for material saving and for manufacturability. The posts 306 fit into corresponding cylindrical recesses 102 in a knuckle 104 of the base 100 (FIGS. 6, 8). A hollowed out portion 105 may be included in the knuckle, for material saving and for manufacturability. A cylindrical magnet 310 may be included in the hinge, for holding the frame assembly 300 upright as shown in FIG. 1. The frame assembly 300 is shown in the folded position in FIG. 4. A corresponding magnet 106 or ferrous material may be included in a recess 116 of the base 100 (FIGS. 6, 8), configured to attract the magnet in the frame assembly 300 A/B and releasably hold it in an upright position. A boss 108 may surround the magnet 106 to provide a hard stop for the pivoting frame assembly 300 A/B.

In an alternative embodiment shown in FIGS. 16-19, a multi-function organizer 400 includes all the features described for the organizer 10, plus a pull-out drawer 410 and associated components. The associated components may include, for example, a drawer pull 412, a guide 414, stops 418 and attachment screws 420 for the guide 414. Optionally, a pad of paper 416 may be kept in the drawer 410.

Figure 23:
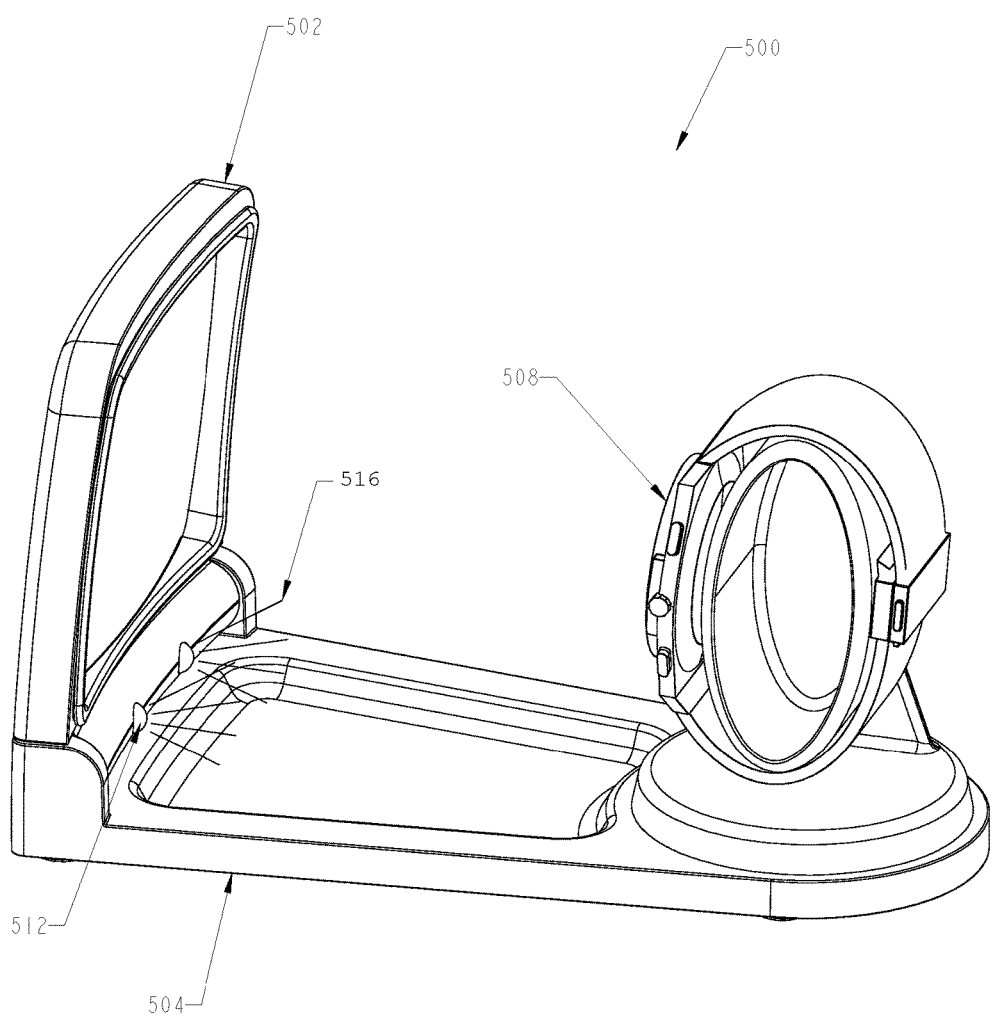
FIG. 23 is a rear perspective view of the organizer shown in FIG. 20 showing the LED illumination on the watch face.
Figure 24:
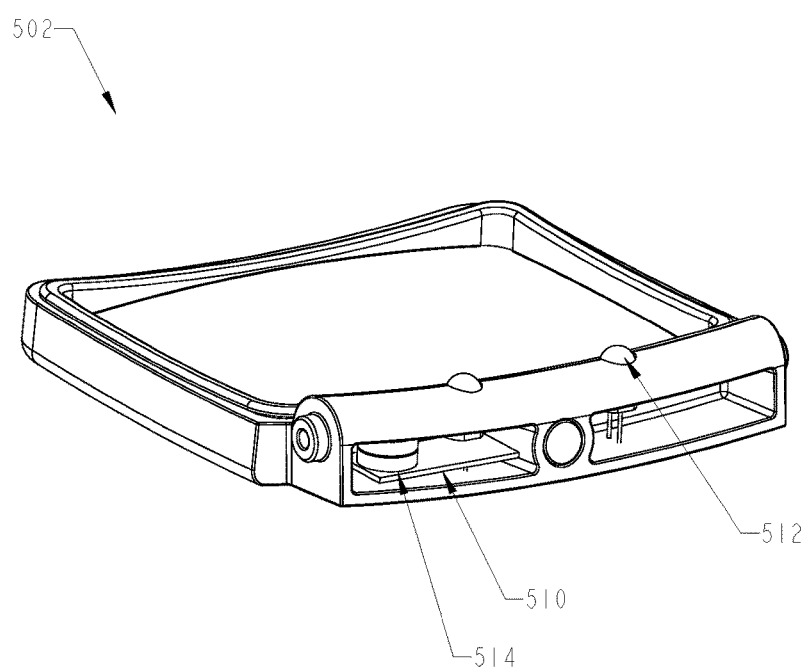
FIG. 24 is a bottom perspective view of the frame assembly with LED's, controller, and battery. Switch, motion sensor, and other components can be integrated into the controller.

Referring to FIGS. 20-24, a multi-function organizer 500 includes all the features described for the organizer 10, except for a differently configured pedestal 506 designed to support a conventional watch 508 in an upright position. Optionally, the pedestal 506 may be made interchangeable with the holder 200 of organizer 10, and releasably attach to the base 504 or base 100 using magnets or other releasable fasteners (e.g., hook-and-loop fabric). As in organizer 10, a lens assembly 502 magnifies the view of the watch face, making it easier to when placed on a table or the like. Visibility may be enhanced by including one or more LED lights 512 directed to the watch face and powered by a battery 514 via a PCB-mounted controller 510 (FIGS. 23-24). The lights 512 may be controlled by a motion sensor, capacitive sensor, or other switch.

In other alternative embodiments including but not limited to the multi-function organizers 500, 10 or 400, the organizer may include a night light 512 oriented to radiate light towards the home location (where the watch face is located). The night light may be useful for illuminating a traditional watch, which lacks a light, as shown in FIGS. 20-24; see light rays 516 in FIG. 23. In the alternative, or in addition, the light 512, or a different light, may be configured to illuminate a different part of the multi-function organizer, for example, a rim of the lens. The multi-function organizer may further include a sensor (not shown) for detecting at least one of motion or touch, coupled to a circuit controller 514 for controlling the night light in response to the sensor. A user interface device enabling user control of the controller 514 may also be included, including user selection of at least "always off" and "sensor responsive" modes for controlling the night light. For example, the user interface device may comprise a multi-pole slidable switch. In embodiments, the user interface device further enables user selection of an "always on" mode for controlling the night light, and perhaps other modes (e.g., "flicker" mode to simulate candlelight, or "dim" mode, etc.). In an alternative, the night light and controller 514 may be packaged in a removable module that couples to an upper surface of the base, as an optional add-on. In general, components of the various multi-function organizers described herein, or to the extent possible the organizers themselves, may be assembled from smaller pieces or each made as an integrated piece.

The invention claimed is:

1. A multi-function organizer, comprising:
   a base configured for stable resting on a flat surface, defining a plane of stability;
   a holder, attached to the base at a first location, the holder configured for supporting a wristwatch or smart watch and orienting a face thereof generally perpendicular to the plane of stability defined by the base, at a home location above the base;
   a magnifying lens attached to the base at a location spaced apart from the holder, oriented so that the lens magnifies the face when a watch is placed on the holder with its body at the home location;
   a night light oriented to radiate light towards the home location; and
   a PCB mounted controller including a sensor for detecting at least one of motion or touch and for controlling the night light in response to the sensor; and
   a user interface device in the form of a multi-pole slidable switch enabling user control of the controller, including user selection of at least "always off" and "sensor responsive" modes for controlling the night light.

2. The multi-function organizer of claim 1, wherein the holder is configured for holding an inductive charger for the smart watch adjacent to the home location, so that the inductive charger, when inserted into the holder, can be held adjacent to a rear surface of a body of the smart watch.

3. The multi-function organizer of claim 2, wherein the holder includes a slot passing through an exterior wall thereof, for admitting a cord of the inductive charger.

4. The multi-function organizer of claim 1, wherein the holder has an overall shape of a tapered cylinder, having an upper diameter in the range of 1 to 2 inches.

5. The multi-function organizer of claim 1, wherein at least one of the base or the holder includes one or more magnets for attaching the holder to the base.

6. The multi-function organizer of claim 1, wherein the holder includes at least one or more protruding stops spaced around an outer perimeter of the holder, configured for preventing a wristband of the wristwatch or smart watch from sliding past the protruding stops.

7. The multi-function organizer of claim 1, wherein the holder is releasable from the base.

8. The multi-function organizer of claim 1, wherein an interior of the holder comprises a cup-like receptacle.

9. The multi-function organizer of claim 1, further comprising a pivoting frame supporting the magnifying lens.

10. The multi-function organizer of claim 9, further comprising a magnet in at least one of the pivoting frame or the base, for holding the pivoting frame in an upward position.

11. The multi-function organizer of claim 1, wherein the base include a tray-like receptacle in an upper surface thereof.

12. The multi-function organizer of claim 1, wherein the user interface device further enables user selection of an "always on" mode for controlling the night light.

* * * * *